United States Patent
Wu et al.

(10) Patent No.: US 11,607,750 B2
(45) Date of Patent: Mar. 21, 2023

(54) ANALYSIS APPARATUS AND ANALYSIS METHOD

(71) Applicant: KIOXIA CORPORATION, Tokyo (JP)

(72) Inventors: Jiahong Wu, Yokkaichi Mie (JP); Yuji Yamada, Kuwana Mie (JP)

(73) Assignee: KIOXIA CORPORATION, Tokyo (JP)

( * ) Notice: Subject to any disclaimer, the term of this patent is extended or adjusted under 35 U.S.C. 154(b) by 452 days.

(21) Appl. No.: 16/796,473

(22) Filed: Feb. 20, 2020

(65) Prior Publication Data

US 2020/0391328 A1 Dec. 17, 2020

(30) Foreign Application Priority Data

Jun. 14, 2019 (JP) .............................. JP2019-111444

(51) Int. Cl.
| | |
|---|---|
| B23K 26/40 | (2014.01) |
| H01J 49/04 | (2006.01) |
| G01B 11/06 | (2006.01) |
| G01B 17/02 | (2006.01) |
| H01J 49/10 | (2006.01) |
| G01N 1/44 | (2006.01) |
| G01B 7/06 | (2006.01) |
| G01N 1/04 | (2006.01) |

(52) U.S. Cl.
CPC .............. *B23K 26/40* (2013.01); *G01B 7/105* (2013.01); *G01B 11/0675* (2013.01); *G01B 17/025* (2013.01); *H01J 49/0463* (2013.01); *G01N 1/44* (2013.01); *G01N 2001/045* (2013.01); *H01J 49/105* (2013.01)

(58) Field of Classification Search
CPC .... B23K 26/40; G01B 7/105; G01B 11/0675; G01B 17/025; H01J 49/0463; H01J 49/105; G01N 1/44; G01N 2001/045
USPC ................ 250/440.11, 441.11, 442.11, 443.1
See application file for complete search history.

(56) References Cited

U.S. PATENT DOCUMENTS

| | | | |
|---|---|---|---|
| 3,700,850 A | 10/1972 | Lumley et al. | |
| 7,960,177 B2 | 6/2011 | Kreyenschmidt et al. | |
| 10,222,337 B1* | 3/2019 | Yoo ....................... | H01J 49/105 |
| 2001/0010423 A1 | 8/2001 | Bauer | |
| 2003/0095266 A1 | 5/2003 | Detalle et al. | |
| 2006/0084957 A1 | 4/2006 | Delfyett et al. | |
| 2007/0296967 A1* | 12/2007 | Gupta ................... | G01J 3/2889 |
| | | | 356/318 |

(Continued)

FOREIGN PATENT DOCUMENTS

| | | |
|---|---|---|
| CN | 101819027 A | 9/2010 |
| JP | H09-133617 A | 5/1997 |

(Continued)

*Primary Examiner* — Nicole M Ippolito
(74) *Attorney, Agent, or Firm* — Foley & Lardner LLP

(57) ABSTRACT

According to one embodiment, an analysis apparatus includes a stage on which to place a sample, a light source, a film thickness measurement unit, and a controller. The light source generates a laser beam to irradiate the sample with the laser beam to cause vaporization of the sample. The film thickness measurer measures a thickness of the sample at a first position where the laser beam irradiates the sample. The controller controls at least one irradiation condition of the laser beam based on the measured thickness of the sample.

22 Claims, 4 Drawing Sheets

(56) References Cited

U.S. PATENT DOCUMENTS

2011/0133074 A1  6/2011 Nakanishi et al.
2017/0167982 A1* 6/2017 Doucet ................ G01N 21/718

FOREIGN PATENT DOCUMENTS

| JP | H11-51904 A | 2/1999 |
|----|-------------|--------|
| JP | H11-201944 A | 7/1999 |
| JP | H11-201945 A | 7/1999 |
| JP | 2003-247920 A | 9/2003 |
| JP | 2004-325390 A | 11/2004 |
| JP | 2004-347473 A | 12/2004 |
| JP | 2005-106688 A | 4/2005 |
| JP | 2005-170373 A | 6/2005 |
| JP | 2006-153660 A | 6/2006 |
| JP | 2012-064523 A | 3/2012 |
| JP | 2013-024806 A | 2/2013 |
| JP | 2014-021097 A | 2/2014 |
| JP | 2018-136190 A | 8/2018 |
| WO | WO-2012/101570 A1 | 8/2012 |
| WO | WO-2014/050786 A1 | 4/2014 |

* cited by examiner

ANALYSIS APPARATUS AND ANALYSIS METHOD

CROSS-REFERENCE TO RELATED APPLICATION

This application is based upon and claims the benefit of priority from Japanese Patent Application No. 2019-111444, filed Jun. 14, 2019, the entire contents of which are incorporated herein by reference.

FIELD

Embodiments described herein relate generally to an analysis apparatus and an analysis method.

BACKGROUND

A laser ablation-inductively coupled plasma-mass spectrometer (LA-ICP-MS) apparatus vaporizes a sample by irradiating the sample with a laser beam using a laser ablation device, introduces the vaporized sample into an ICP-MS device, and performs quantitative analysis of a metal element contained in the sample.

For example, some memory devices have a three-dimensional memory cell array which has a stacked structure of a plurality of different materials, and a plurality of memory cells are three-dimensionally arranged in the stacked structure. In such a stacked structure, a memory hole having a high aspect ratio may be formed. Processes for manufacturing the memory device may include, forming the stacked structure containing metal elements, and/or removing residual metal elements via the memory hole. Accordingly, it is important to control a concentration of the metal element contained in the stacked structure. The LA-ICP-MS apparatus can be used for quantitative analysis of the metal element.

When laser ablation is performed on the stacked structure in which the plurality of different materials are stacked, an ablation rate may greatly change between the different materials, and thus it may be difficult to control the ablation rate. For this reason, it may be difficult to correctly recognize a shape of the stacked structure in a depth direction, and an accurate profile of the metal element contained in the stacked structure may not be obtained.

Examples of related art include JP-A-9-133617, JP-A-11-201944, JP-A-11-051094, and JP-A-2004-347473.

DETAILED DESCRIPTION

Figure 1:
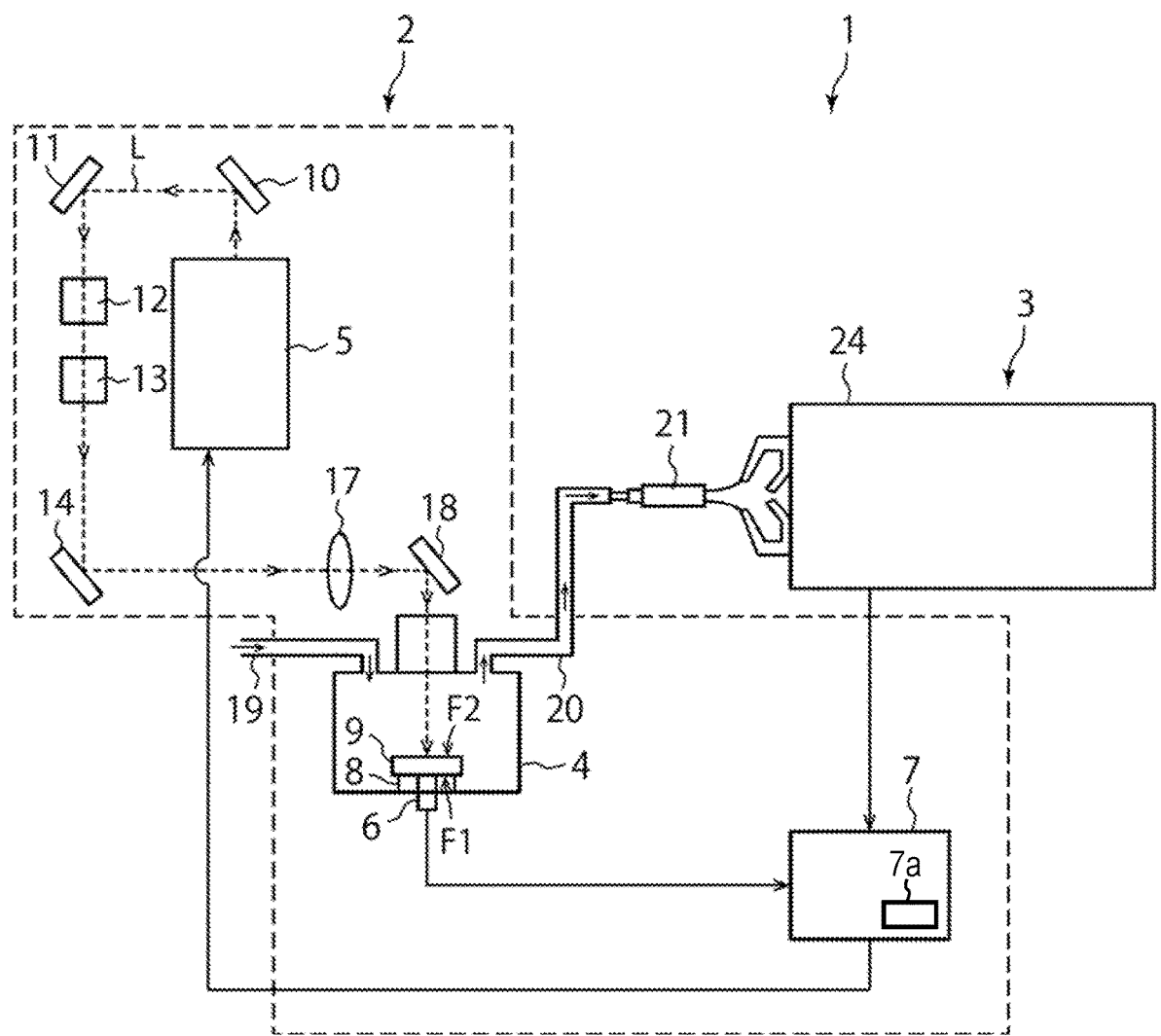
FIG. 1 is a diagram illustrating a configuration example of an LA-ICP-MS apparatus according to the present embodiment.

Embodiments provide an analysis apparatus and an analysis method capable of performing quantitative analysis of a content of a metal element in a depth direction accurately even in a stacked structure in which different materials are stacked.

In general, according to one embodiment, an analysis apparatus includes a stage on which to place a sample, a light source, a film thickness measurement unit, and a controller. The light source generates a laser beam to irradiate the sample with the laser beam to cause vaporization of the sample. The film thickness measurer measures a thickness of the sample at a first position where the laser beam irradiates the sample. The controller controls at least one irradiation condition of the laser beam based on the measured thickness of the sample.

Hereinafter, embodiments according to the present disclosure will be described with reference to the drawings. The present embodiment does not limit the present disclosure. The drawings are schematically or conceptually illustrated, and a ratio of each portion is not necessarily the same as the actual one. In the specification and the drawings, the same reference numerals are given to the same portions as those described with reference to the foregoing drawings, and a detailed description thereof will be omitted as appropriate.

FIG. 1 is a diagram illustrating a configuration example of a LA-ICP-MS apparatus according to the present embodiment. The LA-ICP-MS apparatus 1 as an analysis apparatus includes a laser ablation (LA) unit 2 and an inductively coupled plasma-mass spectrometer (ICP-MS) unit 3. The LA unit 2 performs laser ablation by irradiating a sample 9 with a laser beam L to vaporize the sample 9. The ICP-MS unit 3 performs ionization of the vaporized sample using plasma, and quantitative analysis of elements contained in the vapored and ionized sample. In FIG. 1, the laser beam L is indicated by a broken line arrow, and a flow of data or a control signal is indicated by a solid line arrow.

The LA unit 2 includes a sample chamber 4, a laser unit 5, a film thickness measurement device 6, a controller 7, mirrors 10, 11, 14, and 18, wavelength conversion elements 12 and 13, and a lens 17. A stage 8 is provided in the sample chamber 4. The analysis-target sample 9 is placed on the stage 8 in the sample chamber 4.

The laser unit 5 as a light source generates a laser beam for irradiating the sample 9 to vaporize the sample 9. The laser unit 5 may include, for example, an Nd-YAG laser that generates a laser beam having a wavelength of 1064 nm. In the LA unit 2, the laser beam having a predetermined wavelength (for example, a wavelength of 1064 nm) generated from the laser unit 5 is reflected by the mirrors 10 and 11, and enters the wavelength conversion element 12.

The wavelength conversion element 12 converts the wavelength of the laser beam into a wavelength of 532 nm (a second harmonic wave). Thereafter, the wavelength conversion element 13 converts the wavelength of the laser beam from 532 nm to 266 nm (a third harmonic wave). By setting the wavelength of the laser beam to a short wavelength, the energy of the laser beam can be increased, and thus ablation can be performed on more materials.

As described above, the wavelength of the laser beam is halved by the wavelength conversion element 12, and is further halved by the wavelength conversion element 13. Thereafter, the sample 9 in the sample chamber 4 is irradiated with the laser beam via the mirror 14, the lens 17, and the mirror 18. By irradiating the sample 9 with the laser beam, the sample 9 is vaporized. This process is referred also to as ablation or laser ablation.

An introduction pipe 19 and a discharge pipe 20 are connected to the sample chamber 4 by piping. The introduction pipe 19 introduces a carrier gas such as an argon gas into the sample chamber 4. One end of the discharge pipe 20 is connected to the sample chamber 4, and the other end of the discharge pipe 20 is connected to the ICP-MS unit 3. The discharge pipe 20 discharges the sample 9 vaporized by the laser beam from the sample chamber 4 together with the carrier gas, and conveys the sample to the ICP-MS unit 3. That is, the vaporized sample is conveyed to the ICP-MS unit 3 via the discharge pipe 20 together with the carrier gas introduced into the sample chamber 4 by the introduction pipe 19.

The ICP-MS unit 3 includes a plasma torch 21 and a mass analysis unit 24, and performs quantitative analysis of the gas (vaporized sample) from the sample chamber 4 in order to specify a content of an analysis-target material (element) contained in the sample 9. The plasma torch 21 ionizes the vaporized sample introduced together with the carrier gas from the discharge pipe 20, using plasma. The mass analysis unit 24 is configured to extract and detect only ions of the material of the sample 9 among the introduced ionized gas. In the present embodiment, the internal configuration of the mass analysis unit 24 is not particularly limited, and various kinds of configurations can be adopted. Therefore, a detailed description thereof will be omitted. For example, although the ICP-MS unit 3 is used in the present embodiment an ICP-optical emission spectrometer (ICP-OES) unit may be used instead of the ICP-MS unit 3. In this case, the ICP-OES unit specifies a content of a target element based on an optical wavelength (a spectrum) obtained from the vaporized sample 9. The target element is, for example, a metal element. Hereinafter, it is assumed that the ICP-MS unit 3 detects a metal element contained in the sample 9.

The film thickness measurement device 6 as a film thickness measurement unit measures a thickness of the sample 9 at an irradiation position of the laser beam L. The film thickness measurement device 6 is embedded in the stage 8, and is directed toward a surface F1 of the sample 9 facing the stage 8. That is, the film thickness measurement device 6 measures a film thickness of the sample 9 from the rear surface F1 of the sample 9. The film thickness measurement device 6 may be, for example, any one of an ultrasonic measurement device, a spectral interference measurement device, and an electromagnetic induction measurement device. The film thickness measurement device 6 is not particularly limited as long as the film thickness measurement device 6 can measure the film thickness of the sample 9 in a nondestructive manner. In the present embodiment, the film thickness measurement device 6 measures the film thickness of the sample 9 from the rear surface F1 of the sample 9. On the other hand, as in a modification example to be described, the film thickness measurement device 6 may measure the film thickness of the sample 9 from a surface F2 of the sample 9 to the extent that the film thickness measurement device 6 does not interfere with the laser beam L.

The controller 7 controls an irradiation condition of the laser beam L from the laser unit 5 based on a measured value of the thickness of the sample 9 from the film thickness measurement device 6. The irradiation condition includes, for example, an intensity of the laser beam L, an irradiation time of the laser beam L, the number of times of irradiation (the number of pulses), an irradiation area of the laser beam L, and the like. For example, when a vaporization rate (hereinafter, also referred to as an ablation rate) of the sample 9 by the laser beam L is substantially constant, the controller 7 controls the irradiation condition of the laser beam L such that a change in the thickness of the sample 9 becomes substantially constant. When the ablation rate is too low, the controller 7 increases the intensity of the laser beam L, the irradiation time of the laser beam L, the number of times of irradiation (the number of pulses), and the irradiation area of the laser beam L. When the ablation rate is too high, the controller 7 decreases the intensity of the laser beam L, the irradiation time of the laser beam L, the number of times of irradiation (the number of pulses), and the irradiation area of the laser beam L.

The adjustment of the irradiation area does not directly change the ablation rate. On the other hand, when a detection amount of a metal element is lower than a detection lower limit amount (several pg to several ng) in the ICP-MS unit 3, the ICP-MS unit 3 cannot accurately detect the amount of the metal element since a concentration of the metal element is too low. For this reason, by increasing the irradiation area of the laser beam L, the detection amount of the metal element of the sample is increased. Thereby, the ICP-MS unit 3 can perform quantitative analysis of the concentration of the metal element of the sample 9 accurately. Alternatively, when the detection amount of the metal element exceeds a detection upper limit value (several mg to several thousand mg) in the ICP-MS unit 3, the ICP-MS unit 3 cannot accurately detect the amount of the metal element because the concentration of the metal element exceeds a detectable range of the ICP-MS unit 3. For this reason, by decreasing the irradiation area of the laser beam L, the introduction amount of the metal element of the sample 9 is decreased, and thus the detection amount of the metal element is decreased. Thereby, the ICP-MS unit 3 can perform quantitative analysis of the material of the sample 9 accurately.

Here, the film thickness measurement device 6 measures the thickness of the sample 9 from the rear surface F1 of the sample 9, or measures the thickness of the sample 9 from the front surface F2 of the sample 9 in a state where the film thickness measurement device 6 does not interfere with the laser beam L. Therefore, while the sample 9 is irradiated with the laser beam L, the film thickness measurement device 6 can measure the thickness of the sample 9 at a position at which the sample 9 is irradiated with the laser beam L, in real time. Further, the controller 7 can control the irradiation condition of the laser beam L in real time based on the measured value of the thickness of the sample 9. For example, the film thickness measurement device 6 periodically measures the thickness of the sample 9, and the controller 7 calculates the ablation rate from the temporal change in the thickness of the sample 9. The controller 7 controls the intensity of the laser beam L, the irradiation time of the laser beam L, or the number of pulses of the laser beam L such that the ablation rate becomes a predetermined value. That is, the controller 7 calculates the ablation rate from the film thickness of the sample 9, and performs a feedback control of the laser unit 5 based on the ablation rate. Thereby, the controller 7 can control the ablation rate of the sample 9 in real time such that the ablation rate becomes a predetermined value.

Further, the controller 7 may control the irradiation condition of the laser beam L from the laser unit 5 based on the quantitative analysis result of the sample 9 from the ICP-MS unit 3. For example, the controller 7 may calculate a concentration of the metal element contained in the sample 9 from the quantitative analysis result, and control the irradiation condition of the laser beam L according to the concentration. The quantitative analysis result is a signal intensity of the analysis-target metal element. The concentration of the metal element is calculated as follows. A volume of the sample 9 vaporized by the laser beam L is obtained based on the ablation rate and the irradiation area of the laser beam L. Further, the detection amount of the metal element is obtained from the ICP-MS unit 3. The controller 7 can calculate a concentration of the metal element contained in the sample 9 based on the volume of the vaporized sample 9 (conveyed to the ICP-MS unit 3) and the detection amount of the metal element.

For example, when a stacked material of the sample 9 is a material layer having a low ablation rate (for example, a silicon oxide film or a silicon nitride film), the sample 9 is unlikely to be vaporized, and thus the controller 7 increases the intensity of the laser beam, the irradiation time of the laser beam, or the number of pulses of the laser beam. Thereby, the ablation rate of the sample 9 can be increased. On the other hand, when a stacked material of the sample 9 is a material layer having a high ablation rate (for example, copper or aluminum), the sample 9 is likely to be vaporized, and thus the controller 7 decreases the intensity of the laser beam, the irradiation time of the laser beam, or the number of pulses of the laser beam. Thereby, the ablation rate of the sample 9 can be decreased.

While the sample 9 is irradiated with the laser beam L, the ICP-MS unit 3 can also perform quantitative analysis of the metal element contained in the stacked material of the sample 9, in real time. Further, the controller 7 can calculate a concentration of the metal element contained in the stacked material of the sample 9 in real time based on the quantitative analysis result of the metal element of the sample 9, and can control the irradiation condition of the laser beam. For example, the ICP-MS unit 3 periodically measures a concentration of the metal element contained in the vaporized sample 9, and the controller 7 controls the intensity of the laser beam L, the irradiation time of the laser beam L, or the number of pulses of the laser beam L according to the temporal change in the concentration of the metal element. That is, the controller 7 performs a feedback control of the laser unit 5 based on the concentration of the metal element of the sample 9. Thereby, the controller 7 can control the ablation rate of the sample 9 in real time such that the ablation rate is maintained to an optimum value.

Even when the ablation rate cannot be maintained to a predetermined value due to the concentration of the metal element, the feedback control of the laser beam L can be performed as long as the ablation rate is obtained from the temporal change in the thickness of the sample 9.

Further, as will be described, when the concentration of the metal element of the sample 9 is high, the ablation rate becomes too high, and as a result, the detection amount of the metal element may be higher than the detection upper limit value of the ICP-MS unit 3. In this case, the ICP-MS unit 3 cannot perform quantitative analysis of the metal element accurately. Thus, by changing the irradiation position of the laser beam L or by reducing an area of a region to be ablated, the analysis processing may be continued. Thereby, the detection amount of the metal element becomes lower than the detection upper limit value, and thus the ICP-MS unit 3 can perform quantitative analysis of the metal element accurately.

For example, the controller 7 may be configured with a personal computer, or may be configured with a semiconductor chip such as a CPU. The controller 7 may be provided in the LA unit 2, or may be provided separately from the LA unit 2. Further, the controller 7 may be provided in the ICP-MS unit 3.

As described above, the LA-ICP-MS apparatus 1 according to the present embodiment controls the irradiation condition of the laser beam L by the real time feedback of the thickness of the sample 9 and/or the concentration of the target element (for example, a metal element). Thereby, the LA-ICP-MS apparatus 1 can control the ablation rate of the sample 9 to a predetermined value, and thus the analysis of the material of the sample 9 can be accurately and easily performed. For example, even when the sample 9 has a structure in which a plurality of different materials having different ablation rates are stacked, the ablation rates can be controlled to predetermined values, and thus the analysis of the materials of the sample 9 can be accurately and easily performed.

Next, a quantitative analysis method using the LA-ICP-MS apparatus 1 will be described.

Figure 2:
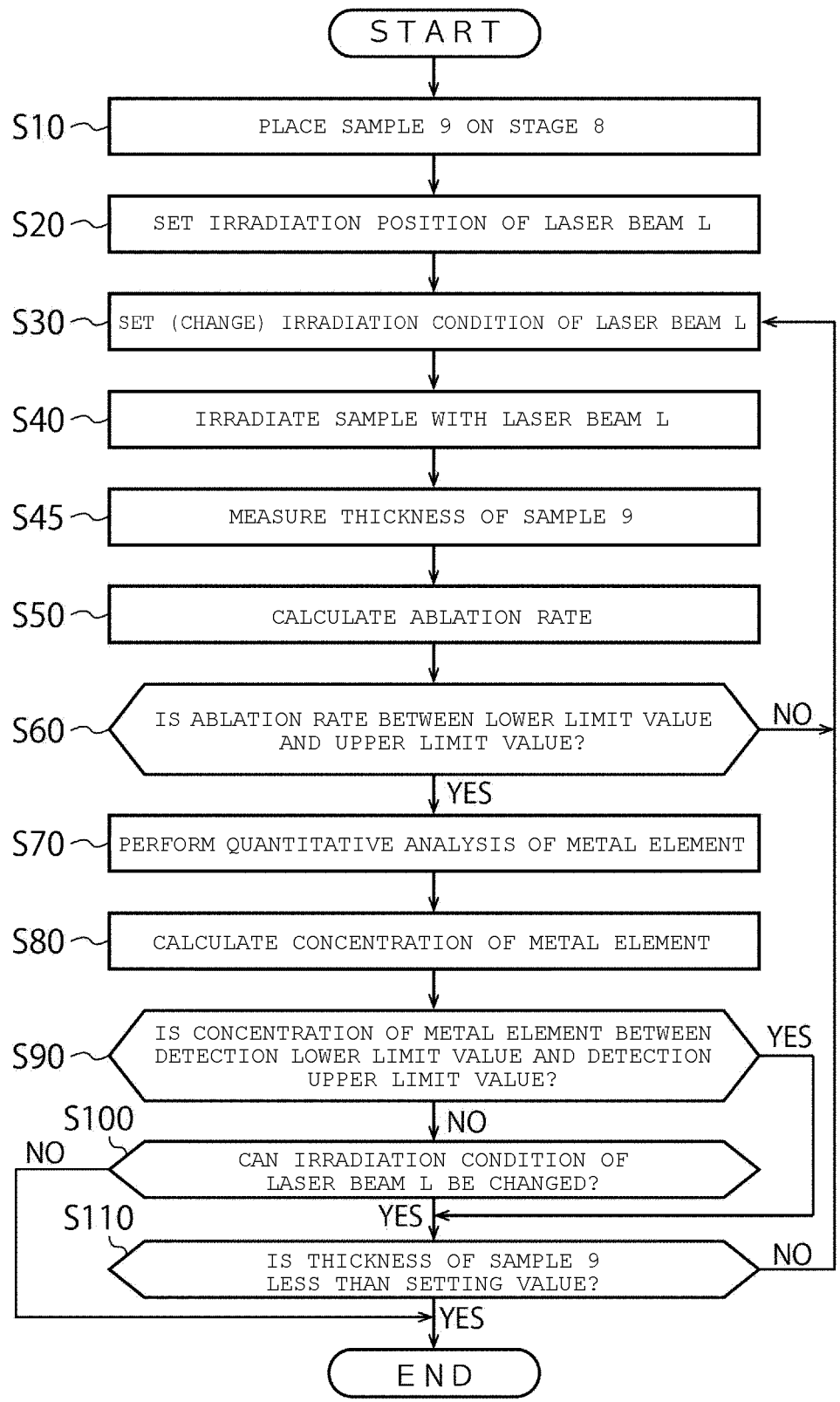
FIG. 2 is a flowchart illustrating an example of a quantitative analysis method according to the present embodiment.

FIG. 2 is a flowchart illustrating an example of a quantitative analysis method according to the present embodiment.

First, the sample 9 is placed on the stage 8 (S10). The sample 9 is placed such that the rear surface F1 of the sample 9 faces the placing surface of the stage 8. Thereby, the film thickness measurement device 6 can measure the thickness of the sample 9 from the rear surface F1 of the sample 9.

Next, the irradiation position of the laser beam L is set so as to correspond to the measurement position of the film thickness measurement device 6 (S20). The irradiation position of the laser beam L is a position on the front surface F2 of the sample 9, and corresponds to the opposite side of the measurement position of the film thickness measurement device 6 on the rear surface F1 of the sample 9. Therefore, when viewed from above the front surface F2 of the sample 9, the irradiation position of the laser beam L and the measurement position of the film thickness measurement device 6 substantially match with each other. The irradiation position of the laser beam L can be set by adjusting the mirror 18 or the like. At this time, the irradiation condition of the laser beam L is set to a certain initial state. At this time, the irradiation area of the laser beam L is also set.

Before and after the measurement position is set, the irradiation condition of the laser beam L is set (S30). For example, the intensity of the laser beam L, the irradiation time of the laser beam L, the number of pulses of the laser beam L, the irradiation area of the laser beam L, and the like are set.

Next, the sample 9 is irradiated with the laser beam L (S40). At the same time, the thickness of the sample 9 is measured (S45). The sample 9 may be continuously irradiated with the laser beam L, or may be periodically irradiated with the laser beam L in a pulse pattern. The film thickness measurement by the film thickness measurement device 6 may be performed continuously or periodically. The film thickness measurement device 6 may perform the film thickness measurement for each of the number n of pulses of the laser beam L (n is a positive integer). At the irradiation position of the laser beam L, the material of the sample 9 is vaporized from the front surface F2 of the sample 9, and thus the sample 9 is scraped from the front surface F2. As the sample 9 is vaporized, the thickness of the sample 9 is gradually decreased. At this time, the film thickness measurement device 6 measures the thickness of the sample 9 from the rear surface F1 of the sample 9.

The controller 7 calculates a vaporization rate (an ablation rate) from a change rate of the thickness of the sample 9 (S50). The controller 7 performs a feedback control of the irradiation condition of the laser beam L from the laser unit 5 such that the ablation rate is within a predetermined range. At this time, the controller 7 determines whether the ablation rate is lower than the lower limit value or higher than the upper limit value (S60). A memory unit 7a of the controller 7 may previously store information about the sample 9. More specifically, the memory unit 7a may store information about the materials contained in the sample 9 in correlation with the positions thereof. In this case, the controller 7 may determine based on the measured thickness of the sample 9 what material thereof is being ablated (vaporized), instead of or in addition to monitoring of the change rate of the thickness of the sample 9. The upper limit value and the lower limit value of the ablation rate may also be stored in the memory unit 7a of the controller 7 in correlation with the material contained in the sample 9.

For example, when the ablation rate is lower than the lower limit value (NO in S60), in step S30, the controller 7 may increase the intensity of the laser beam L. On the other hand, when the ablation rate is higher than the upper limit value (NO in S60), in step S30, the controller 7 may decrease the intensity of the laser beam L. Thereby, the irradiation condition of the laser beam L can be controlled such that the ablation rate is within the predetermined range. As described above, the controller 7 can calculate the ablation rate using the measured value of the thickness of the sample 9, and can perform a feedback control of the irradiation condition of the laser beam L according to the ablation rate. At this time, when the ablation rate is set within a certain narrow range, the controller 7 can maintain the ablation rate to a predetermined value, and thus the ablation rate can become substantially constant. By maintaining the ablation rate to a substantially constant value, the quantitative analysis of the metal element contained in the sample 9 can be performed more accurately. Therefore, in order to perform accurate quantitative analysis, it is preferable to perform the feedback control of the irradiation condition of the laser beam L such that the ablation rate is maintained to a substantially constant value.

Further, even when the irradiation condition of the laser beam L is changed to the limit, in a case where the ablation rate cannot be controlled between the upper limit value and the lower limit value, the controller 7 may stop the analysis processing. On the other hand, when the ablation rate is between the upper limit value and the lower limit value (YES in S60), the ICP-MS unit 3 performs quantitative analysis of the metal element contained in the sample 9 (S70).

Next, the ICP-MS unit 3 or the controller 7 measures an amount of the metal element contained in the ablated material, and calculates a detection amount and a concentration of the metal element (S80).

The detection amount or the concentration of the metal element contained in the sample 9 is used to determine whether or not the quantitative analysis result by the ICP-MS unit 3 is accurate. As described above, when the detection amount or the concentration of the metal element is lower than the detection lower limit value of the ICP-MS unit 3 or higher than the detection upper limit value, the ICP-MS unit 3 cannot perform quantitative analysis of the metal element of the sample 9 accurately. For this reason, it is necessary to determine whether the detection amount or the concentration of the metal element is lower than the detection lower limit value or whether the detection amount or the concentration of the metal element is higher than the detection upper limit value. Here, the detection lower limit value is a lower limit value of the detection amount or the concentration of the metal element that can be quantitatively analyzed, and the detection upper limit value is an upper limit value of the detection amount or the concentration of the metal element that can be quantitatively analyzed. Hereinafter, determining whether the quantitative analysis can be performed, whether the irradiation area of the laser beam L is readjusted, or whether the analysis is ended based on the concentration of the metal element will be described.

The controller 7 determines whether the concentration of the metal element obtained from the ICP-MS unit 3 is lower than the detection lower limit value or higher than the detection upper limit value (S90). When the concentration of the metal element is higher than the detection upper limit value (NO in S90), since there are too many metal elements as a detection target (the concentration is too high), the concentration of the metal element exceeds a detectable range of the ICP-MS unit 3. In this case, the ICP-MS unit 3 cannot detect the concentration of the metal element accurately, as the concentration obtained by the ICP-MS unit 3 saturates. For this reason, the controller 7 decreases the ablation rate by changing the irradiation condition of the laser beam L (for example, by decreasing the irradiation area of the laser beam L or by decreasing the intensity of the laser beam L) (YES in S100 and steps S110 and S30). When the irradiation condition of the laser beam L cannot be changed any more (NO in S100), the LA-ICP-MS apparatus 1 stops the analysis processing.

On the other hand, when the ablation rate is lower than the lower limit value (NO in S90), since the metal elements are too little (the concentration is too low), the ICP-MS unit 3 cannot detect the metal element. For this reason, in this case, the controller 7 increases the ablation rate by changing the irradiation condition of the laser beam L (for example, by increasing the irradiation area of the laser beam L or by increasing the intensity of the laser beam L) (YES in S100 and steps S110 and S30). When the irradiation condition of the laser beam L cannot be changed any more (NO in S100), the LA-ICP-MS apparatus 1 stops the analysis processing.

When the ablation rate is between the upper limit value and the lower limit value (YES in S90), the ICP-MS unit 3 can accurately detect the metal element. Therefore, the ICP-MS unit 3 performs quantitative analysis of the metal element contained in the stacked material of the sample 9 (S30 to S70). Even when the irradiation condition of the laser beam L cannot be changed any more in step S100 (NO in S100), the ICP-MS unit 3 may continue the quantitative analysis of the material of the sample 9 without stopping the quantitative analysis. Although the concentration of the metal element obtained by the quantitative analysis may be inaccurate, the concentration may be used as an index of the metal element.

The steps S30 to S100 are repeated until the thickness of the sample 9 becomes less than a setting value (NO in S110). When the thickness of the sample 9 becomes less than the setting value (YES in S110), the analysis processing is ended.

According to the present embodiment, the controller 7 calculates an ablation rate from the measured value of the thickness of the sample 9, and performs a feedback control of the irradiation condition of the laser beam L in real time based on the ablation rate. Thereby, the LA-ICP-MS apparatus 1 can control the irradiation condition of the laser beam L such that the ablation rate of the sample 9 becomes a predetermined value or is within a predetermined range. Therefore, the quantitative analysis of the material of the sample 9 can be accurately and easily performed.

For example, a memory hole having a high aspect ratio is provided in a three-dimensional memory cell array. In order to improve performance of the memory cell, a metal film may be formed in the memory hole. In this case, the LA-ICP-MS apparatus 1 is used to obtain the content (concentration) of the metal element.

On the other hand, the three-dimensional memory cell array has a stacked structure in which a plurality of silicon oxide films and a plurality of silicon nitride films are alternately stacked. For this reason, in the LA-ICP-MS apparatus in the related art, since the ablation rate greatly changes according to a change of the stacked material, it is difficult to control the ablation rate, and it is difficult to obtain an accurate profile of the stacked structure.

In contrast, the LA-ICP-MS apparatus 1 according to the present embodiment measures the thickness of the sample 9, and performs a feedback control of the irradiation condition of the laser beam L in real time based on the measured value of the thickness of the sample 9. Thereby, even when the analysis target is a stacked structure of silicon oxide films and silicon nitride films, such as a three-dimensional memory cell array, the LA-ICP-MS apparatus 1 can maintain the ablation rate to a predetermined value, and thus an accurate profile of the stacked structure can be obtained.

Figure 3:
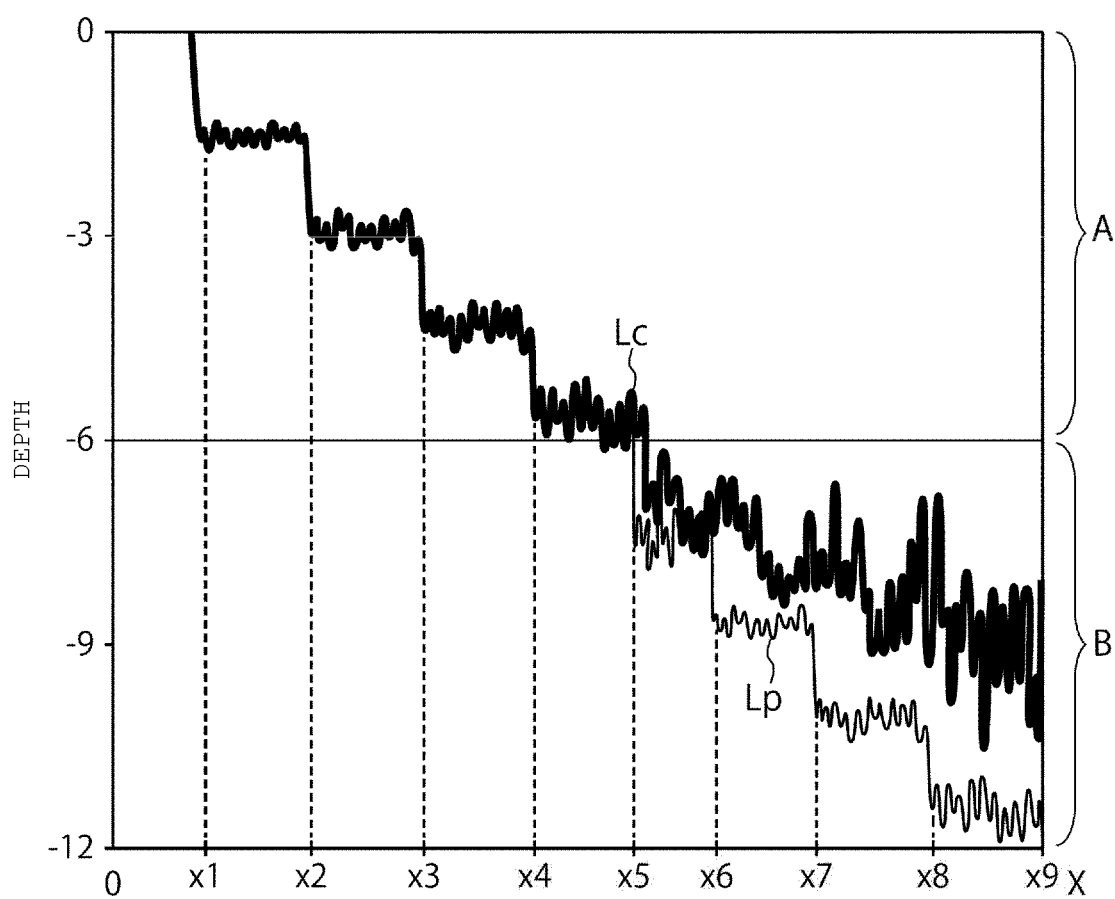
FIG. 3 is a graph illustrating an example of a shape of a sample formed by laser ablation.

FIG. 3 is a graph illustrating an example of a shape of the sample 9 formed by laser ablation. In the graph, a vertical axis indicates a depth of the sample 9 from the front surface of the sample 9. A horizontal axis indicates a position X on the front surface of the sample 9. The depth 0 indicates the front surface of the sample 9. A material A (for example, a silicon oxide film) is contained near the front surface of the sample 9, and a material B (for example, a silicon nitride film) is contained under the front surface of the sample 9. The materials A and B correspond to a part of the stacked structure, and have different ablation rates. Further, in order to facilitate understanding of effects according to the present embodiment, for convenience of explanation, it is assumed that the sample 9 is scraped from a position x1 to a position x9 in a stepped shape by laser ablation. This can be realized by changing the irradiation position of the laser beam L. A line Lc indicates a shape of the sample 9 when a feedback control of the irradiation condition of the laser beam L is not performed. A line Lp indicates a shape of the sample 9 when a feedback control of the irradiation condition of the laser beam L is performed.

First, the LA unit 2 vaporizes the sample 9 by ablation by irradiating the sample 9 with the laser beam L within a range from a position x1 to a position x9 on the front surface of the sample 9. Next, the LA unit 2 performs a laser ablation to vaporize the sample 9 by irradiating the sample 9 with the laser beam L within a range from a position x2 to the position x9 on the front surface of the sample 9. Next, the LA unit 2 further performs a laser ablation to vaporize the sample 9 by irradiating the sample 9 with the laser beam L within a range from a position x3 to the position x9 on the front surface of the sample 9. Similarly, the LA unit 2 performs a laser ablation within a range from a position x4 to the position x9, a range from a position x5 to the position x9, a range from a position x6 to the position x9, a range from a position x7 to the position x9, and a range from a position x8 to the position x9 on the front surface of the sample 9. Thereby, a stepped shape as illustrated in FIG. 3 is formed on the front surface of the sample 9. In actual laser ablation, the LA unit 2 straightly scrapes the sample 9 from the front surface of the sample 9 in the vertical direction without changing the irradiation range of the laser beam L.

Here, it is assumed that the irradiation condition of the laser beam L is initially set so as to ablate the material A. When a feedback control is not performed, as indicated by the line Lc, the material A is formed in a stepped shape, while the material B is not formed in a stepped shape. That is, when a feedback control is not performed, the LA unit 2 can appropriately ablate the material A, but cannot ablate the material B as appropriate.

On the other hand, when a feedback control is performed as in the present embodiment, the materials A and B are formed in a stepped shape as indicated by the line Lp. That is, in the present embodiment, the LA unit 2 can appropriately ablate both of the materials A and B. As described above, according to the present embodiment, even when the sample 9 has a structure in which a plurality of different materials having different ablation rates are stacked, the ablation rates can be appropriately controlled. Thereby, the analysis of the material of the sample 9 can be accurately and easily performed.

Modification Example

Figure 4:
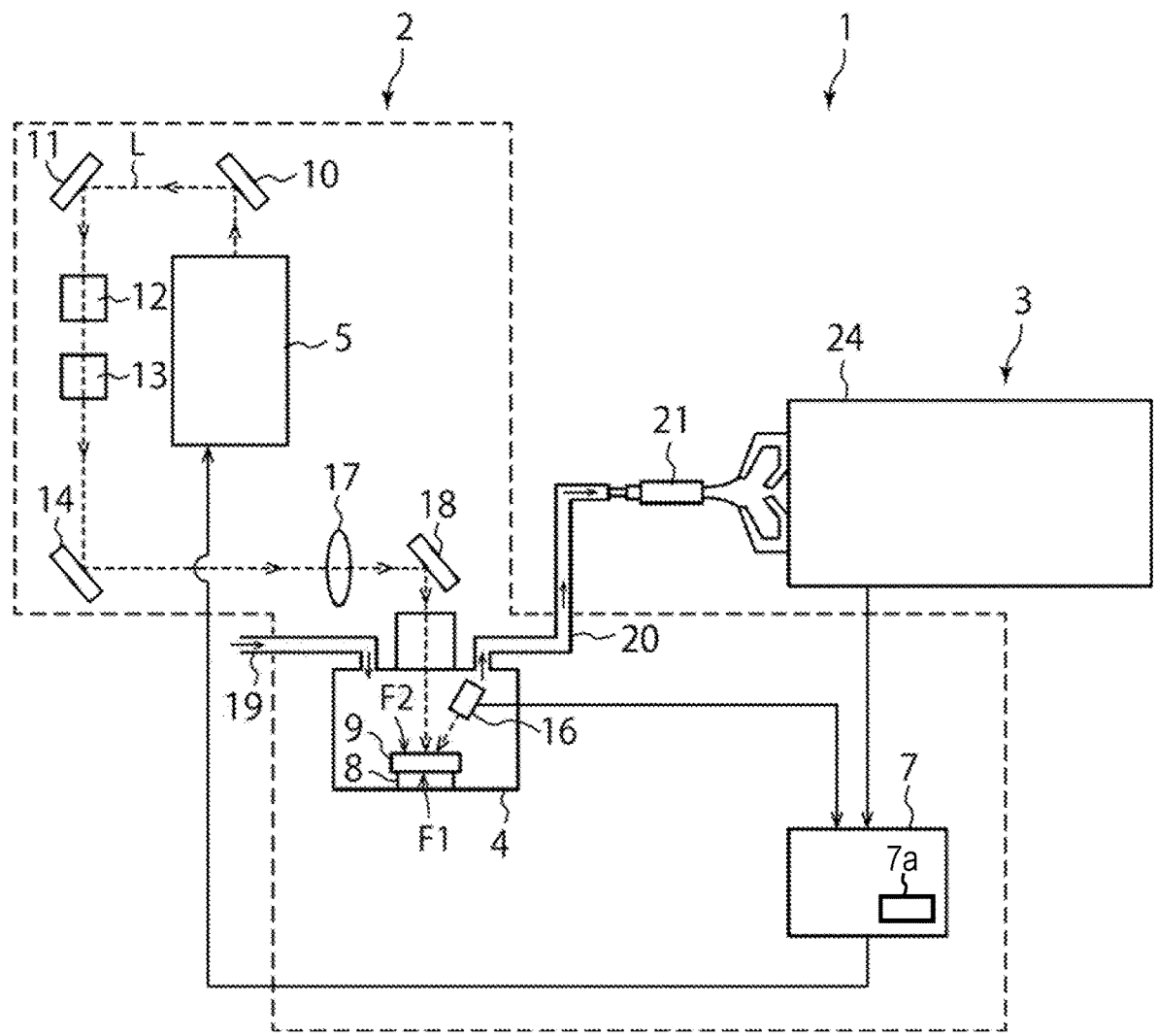
FIG. 4 is a diagram illustrating a configuration example of an LA-ICP-MS apparatus according to a modification example of the present embodiment.

FIG. 4 is a diagram illustrating a configuration example of an LA-ICP-MS apparatus according to a modification example of the present embodiment. The film thickness measurement device 16 is provided above the stage 8, and measures the film thickness of the sample 9 from above the sample 9. The film thickness measurement device 16 may measure the film thickness of the sample 9 from the front surface F2 of the sample 9 using a light beam that does not interfere with the laser beam L, for example, using white interference light, differential interference light, confocal light, or the like. Even in the modification example, the effect according to the present embodiment can be obtained.

Further, the film thickness measurement devices 6 and 16 may measure the film thickness of the sample 9 from both of the rear surface F1 and the front surface F2 of the sample 9 by a combination of the modification example and the first embodiment. Thereby, the thickness of the sample 9 can be measured more accurately.

At least a part of the analysis method according to the present embodiment may be implemented by hardware, or may be implemented by software. When a part of the analysis method is realized by software, a program for providing at least some of functions of the data processing method may be stored in a recording medium such as a flexible disk or a CD-ROM, and the program may be read and executed by a computer. The recording medium is not limited to a removable medium such as a magnetic disk or an optical disk, and may be a fixed recording medium such as a hard disk device or a memory device. In addition, a program for providing at least some of functions of the analysis method may be distributed via a communication line (including wireless communication) such as the Internet. Further, the program may be distributed by being encrypted, modulated, or compressed, or by being stored in a recording medium, via a wired line such as the Internet or via wireless communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An analysis apparatus comprising:
a stage on which to place a sample which has a stacked structure of one or more films;
a light source configured to generate a laser beam to irradiate the sample with the laser beam to cause vaporization of the sample;
a thickness measurer configured to measure a thickness of the sample at a first position where the laser beam irradiates the sample; and
a controller configured to control at least one irradiation condition of the laser beam based on the measured thickness of the sample being provided by the thickness measurer.

2. The analysis apparatus according to claim 1,
wherein the controller is further configured to control the at least one irradiation condition based on a quantitative analysis result of the vaporized sample.

3. The analysis apparatus according to claim 1,
wherein the thickness measurer includes at least one of: an ultrasonic measurement device, a spectral interference measurement device, or an electromagnetic induction measurement device.

4. The analysis apparatus according to claim 1,
wherein the thickness measurer is provided as part of the stage and is further configured to measure the film thickness of the sample from a surface of the sample facing the stage.

5. The analysis apparatus according to claim 1,
wherein the controller is further configured to control the at least one irradiation condition of the laser beam based on the measured thickness of the sample to cause a vaporization rate of the sample to become a predetermined value.

6. The analysis apparatus according to claim 1,
wherein the controller is further configured to control the at least one irradiation condition of the laser beam based on a quantitative analysis result of the sample to cause a vaporization rate of the sample to become a predetermined value.

7. The analysis apparatus according to claim 1,
wherein, while the sample is irradiated with the laser beam, the thickness measurer is configured to measure the thickness of the sample, and the controller is configured to control the at least one irradiation condition of the laser beam based on the measured thickness of the sample.

8. The analysis apparatus according to claim 7,
wherein, while the sample is irradiated with the laser beam, the controller is configured to control the at least one irradiation condition of the laser beam based on a change rate of the measured thickness of the sample.

9. The analysis apparatus according to claim 7, further comprising:
a memory unit which stores information correlating materials contained in the sample and positions of the materials in the sample,
wherein, while the sample is irradiated with the laser beam, the controller is configured to control the at least one irradiation condition of the laser beam based on a kind of the material being vaporized based on the information stored in the memory unit and the measured thickness of the sample.

10. The analysis apparatus according to claim 1,
wherein, while the sample is irradiated with the laser beam, the controller is configured to control the at least one irradiation condition of the laser beam based on a quantitative analysis result of the sample.

11. The analysis apparatus according to claim 1,
wherein the at least one irradiation condition includes one or more of: an intensity of the laser beam, an irradiation time of the laser beam, a number of times of irradiation, an irradiation area of the laser beam, and an irradiation depth of the laser beam.

12. The analysis apparatus according to claim 1,
wherein the controller is further configured to calculate a concentration of a material in the sample from a quantitative analysis result of the sample, and control the at least one irradiation condition of the laser beam according to the concentration of the material.

13. The analysis apparatus according to claim 1,
wherein a second position where the thickness of the sample is measured is opposite to the first position.

14. The analysis apparatus according to claim 1,
wherein the thickness measurer is provided above the stage and configured to measure the thickness of the sample from above the sample.

15. The analysis apparatus according to claim 14,
wherein the thickness measurer is further configured to measure the thickness of the sample using a light beam that does not interfere with the laser beam.

16. An analysis method, comprising:
vaporizing a sample by irradiating the sample with a laser beam, wherein the sample includes a stacked structure of one or more films;
measuring a thickness of the sample at a position where a laser beam irradiates the sample; and
controlling at least one irradiation condition of the laser beam based on the measured thickness of the sample.

17. The analysis method according to claim 16,
wherein controlling at least one irradiation condition of the laser beam is based on a quantitative analysis result of the vaporized sample.

18. The analysis method according to claim 16,
wherein measuring a thickness of the sample further comprises measuring the thickness from a surface of the sample facing the stage.

19. The analysis method according to claim 16,
wherein controlling at least one irradiation condition of the laser beam further comprises causing a vaporization rate of the sample to become a predetermined value.

20. The analysis method according to claim 16, further comprising:
controlling the at least one irradiation condition of the laser beam based on a quantitative analysis result of the sample, thereby causing a vaporization rate of the sample to become a predetermined value.

21. The analysis method according to claim 16,
wherein, while irradiating the sample with the laser beam, the method further comprises:
measuring, by a film measurer, the thickness of the sample; and
controlling, by a controller, the at least one irradiation condition of the laser beam based on the measured thickness of the sample.

22. The analysis method according to claim 16,
wherein, while irradiating the sample with the laser beam, the method further comprises:
controlling, by a controller, the at least one irradiation condition of the laser beam based on a quantitative analysis result of the sample.

* * * * *